(12) United States Patent
Iwahashi

(10) Patent No.: US 7,010,477 B1
(45) Date of Patent: Mar. 7, 2006

(54) INFORMATION PROCESSING DEVICE INFORMATION PROCESSING METHOD, AND RECORDING MEDIUM

(75) Inventor: Naoto Iwahashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 915 days.

(21) Appl. No.: 09/830,532

(22) PCT Filed: Aug. 31, 2000

(86) PCT No.: PCT/JP00/05938

§ 371 (c)(1),
(2), (4) Date: Jun. 25, 2001

(87) PCT Pub. No.: WO01/16794

PCT Pub. Date: Mar. 8, 2001

(30) Foreign Application Priority Data

Aug. 31, 1999 (JP) .............................. P11-245461

(51) Int. Cl.
G06F 17/28 (2006.01)
G06F 17/27 (2006.01)
G06F 17/20 (2006.01)

(52) U.S. Cl. .................. 704/7; 704/1; 704/10; 704/9

(58) Field of Classification Search .............. 704/7, 704/8, 9, 4, 1, 10
See application file for complete search history.

(56) References Cited

U.S. PATENT DOCUMENTS 4,905,287 A * 2/1990 Segawa ...................... 704/254

(Continued)

FOREIGN PATENT DOCUMENTS

JP        6-274548        9/1994

(Continued)

OTHER PUBLICATIONS

Hirakawa et al. "Inhertied Feature-based Similarity Measure Based on Large Semantic Hierarchy and Large Text Corpus," 1996, Proceedings of the 16th conference on Computational linguistics—vol. 1, pp.: 508-513.*

(Continued)

*Primary Examiner*—Richemond Dorvil
*Assistant Examiner*—Thomas E. Shortledge
(74) *Attorney, Agent, or Firm*—Frommer Lawrence & Haug LLP; William S. Frommer; Samuel S. Lee

(57) ABSTRACT

A word is input, along with a concept notation function that is a function for expressing what are described by that word, from a word set output unit to an optimal word string output unit. The optimal word string output unit computes a similarity between a word from the word set output unit and a registered word registered in a dictionary. The optimal word string output unit computes, even when a word not registered in the dictionary is input, a similarity between that word and a word registered in the dictionary.

9 Claims, 10 Drawing Sheets

U.S. PATENT DOCUMENTS

| | | | |
|---|---|---|---|
| 4,916,614 A | | 4/1990 | Kaji et al. |
| 5,652,898 A | | 7/1997 | Kaji |
| 5,692,097 A | * | 11/1997 | Yamada et al. ............. 704/241 |
| 5,791,904 A | * | 8/1998 | Russell et al. .............. 434/167 |
| 5,797,123 A | * | 8/1998 | Chou et al. ................. 704/256 |
| 6,108,628 A | * | 8/2000 | Komori et al. ............. 704/256 |

FOREIGN PATENT DOCUMENTS

| | | |
|---|---|---|
| JP | 6-290210 | 10/1994 |
| JP | 9-134360 | 5/1997 |
| JP | 11-259482 | 9/1999 |

OTHER PUBLICATIONS

Patent Abstracts of Japan vol. 018, No. 690 (P-1851), Dec. 26, 1994 & JP 06 274546 A (A T R Jido Honyaku Denwa Kenkyusho:KK), Sep. 30, 1994.

Patent Abstracts of Japan vol. 016, No. 100 (P-1323), Mar. 11, 1992 & JP 03 276367 A (A T R Jido Honyaku Denwa Kenkyusho:KK), Dec. 6, 1991.

* cited by examiner

| WORD NO. | TEXT NOTATION | SOUND NOTATION | CONCEPT NOTATION |
|---|---|---|---|
| $w_1$ | ××○○○ | ····· | ····· |

FIG.3A

| WORD TRAIN NO. | WORD TRAIN |
|---|---|
| $s_1$ | $w_1, w_2 \cdots$ |

FIG.3B

UPSIDE

BOTTOM

LEFT

RIGHT

INFORMATION PROCESSING DEVICE INFORMATION PROCESSING METHOD, AND RECORDING MEDIUM

TECHNICAL FIELD

This invention relates to an information processing apparatus, an information processing method and a recording medium, and more particularly to the information processing apparatus, the information processing method and the recording medium which permits, e.g., a calculation of analogousness between words with respect to many words even if a large scale dictionary is not provided, and can convert set of words into arrangement of words (word train) which constitutes suitable meaning even if complicated grammatical rule, etc. is not provided.

BACKGROUND ART

Analogousness (similarity) in point of meaning between words is used in various use purposes in the natural language processing technology.

Namely, for example, as a technique of translation processing, there is a method in which a large number of bilingual illustrative sentences are prepared in advance to search an illustrative sentence which is most analogous to an input sentence from such bilingual illustrative sentences to modify the bilingual illustrative sentence thus searched to generate the translation sentence in which the input sentence is translated. In such a method, the analogousness between the input sentence and the bilingual illustrative sentence is calculated on the basis of the analogousness between respective words constituting such input sentence and words constituting the bilingual illustrative sentence corresponding to those words (word analogousness).

As a method of calculating the word analogousness, there are known a method using thesaurus in the form of tree or network and/or a method using co-occurrence information in the sentence of words.

In the method using thesaurus, e.g., in thesaurus, the number of arcs constituting the shortest path connecting nodes corresponding to respective two words in which the word analogousness is calculated is determined. An inverse number of the number of arcs is caused to be the word analogousness. In addition, in the method using co-occurrence information, with respect to a large number of sentences, co-occurrence information of words appearing in those sentences are registered. Thus, the word analogousness is determined on the basis of statistical quantity obtained from such co-occurrence information (statistical quantity of words easy to co-occur with respective two words in which the word analogousness attempts to be calculated).

It is to be noted that, with respect to the method of calculating the word analogousness using the thesaurus, the detail is described, e.g., in D-II, Vol. J77-D-II, No. 3, pp. 557–565, 1994, Jin Iida "Cancellation of use initiative ambiguity of modification destination of English prepositional phrase" Bulletin of Electronic Information Communication Society, and with respect to the method of calculating the word analogousness using co-occurrence information, the detail is described, e.g., in Donald Hindle, "Noun classification from predicate-argument structures", Proceedings of Annual meeting of the Association for Computational Linguistics, pp. 268–275, 1990, etc.

Meanwhile, in the method using the thesaurus or the co-occurrence information, with respect to words which are not registered in the thesaurus or words in which co-the occurrence information are not registered (hereinafter referred to as unregistered words as occasion may demand), the word analogousness cannot be calculated. Accordingly, in the case where an attempt is made to realize abundant linguistic ability in the language processing system which carries out language processing by using thesaurus or co-occurrence information, it is necessary to carry out learning by using a vast amount of learning samples to generate a dictionary in which the thesaurus or the co-occurrence information are registered.

However, in the language processing system, it is desirable to carry out flexible and efficient learning only by lesser number of samples for learning so that abundant language ability can be realized. To realize this, it is required to calculate, also with respect to unregistered words, the word analogousness between those unregistered words and learned words, and it is also required to calculate the analogousness (word train analogousness) between a word train including unregistered words and a word train obtained from the learned grammatical rule.

On the other hand, e.g., in Naoki Fukui, "Development of minimum model-oriented to explanatory theory of language" Iwanami lecture, Science of language 6 generation grammar, Chapter 4, Iwanami bookstore, 1998, etc., it is described that an operation that the human being arranges sets of plural words in suitable order in conformity with grammar is the root of mental or psychological operation in the language ability of the human being, and elucidation of the mechanism of that psychological function is dealt as an important research theme in the theoretical linguistic science.

In addition, the realization of function to generate an arrangement of words similar to an arrangement that the human being carries out is desired also in the development of the system of realizing (simulating) (the entirety or a portion of) the language function of the human being.

However, under present situations, at the initial stage of learning in the language processing system, i.e., the stage where learning of grammatical rule is insufficient, or words to be processed are not given as a sample for learning, it is impossible to calculate the word analogousness and the word train analogousness. Thus, it is difficult to obtain a suitable arrangement of words (word train). In addition, in the case where the word trains obtained by an insufficient grammatical rule can be only outputted, representation ability of the language of the system would be restricted.

From above facts, there is required a technique in which, also with respect to words which are not registered in the dictionary obtained by learning, the word analogousness between unregistered words and words registered in the dictionary (hereinafter referred to as registered words as occasion may demand) is calculated and clustering of words based on such word analogousness is permitted to be carried out to allow learned grammar to have more generality.

DISCLOSURE OF THE INVENTION

In view of the above-mentioned circumstances, this invention has been made and contemplates permitting a calculation of the analogousness between words with respect to many words even if large scale dictionary is not provided, and permitting conversion of set of words into word train which takes a suitable meaning even if the complicated grammatical rule, etc. is not provided.

An information processing apparatus according to this invention comprises input means for inputting word along with concept notation function which is function for representing matter that the word indicates, and word analogousness calculating means for calculating word analogousness which is analogousness between the word and the registered word.

In dictionary, the registered word may be stored along with concept notation function with respect to that the registered word.

In the information processing apparatus according to this invention, there may be further provided dictionary memory means in which dictionary is stored.

The concept notation function may be a function for representing information obtained from matter that word indicates.

Moreover, the concept notation function may be a function for representing information obtained from output of sensor means for sensing stimulus given from matter that word indicates.

The sensor means may be a device for converting light or sound into electric signal, touch sensor, temperature sensor or acceleration sensor. In this case, the concept notation function may be a function for representing parameter obtained by observing matter that word indicates by the sensor means.

The concept notation function may be a probability density function or discrete probability distribution function.

The word analogousness calculating means is permitted to calculate word analogousness between the word and the registered word on the basis of Bhattacharyya distance or Kullback divergence between concept notation functions of that word and the registered word.

In the input means, word set which is set of words is inputted along with concept notation functions with respect to respective words. Dictionary is permitted to store set of the registered word train in which plural registered words are arranged along with concept notation functions with respect to respective registered words. In this case, the information processing apparatus may further comprise word train generating means for generating word train in which words constituting word set are arranged, word train analogousness calculating means for calculating word train analogousness which is analogousness between word train and registered word train from word analogousness between respective words constituting word train and registered words constituting registered word train corresponding to such words, and output means for outputting word train in which words constituting word set are arranged in a predetermined order on the basis of word train analogousness.

An information processing method according to this invention comprises an input step of inputting word along with concept notation function which is function for representing matter that the word indicates, and a word analogousness calculation step of calculating word analogousness which is analogousness between word and registered word on the basis of the concept notation function.

A recording medium according to this invention is adapted so that there is recorded program including an input step of inputting word along with concept notation function which is function for representing matter that the word indicates, and a word analogousness calculation step of calculating word analogousness which is analogousness between word and registered word on the basis of the concept notation function.

In the information processing apparatus, the information processing method and the recording medium according to this invention, a word is inputted along with concept notation function which is a function for representing matter that the word indicates. Thus, word analogousness which is the analogousness between the word and the registered word is calculated on the basis of the concept notation function.

Moreover, an information processing apparatus according to this invention comprises function generating means for generating concept notation function which is a function for representing matter that registered word which is word registered into dictionary indicates, and correspondence providing means for allowing the registered word and concept notation function with respect to that registered word to correspond to each other.

The concept notation function may be a function for representing information obtained from matter that the word indicates.

Further, the concept notation function may be a function for representing information obtained from output of sensor means for sensing stimulus given from matter that word indicates.

The sensor means may be a device for converting light or sound into electric signal, touch sensor, temperature sensor or acceleration sensor, and the concept notation function may be a function for representing parameter obtained by observing matter that word indicates by the sensor means.

The concept notation function may be a probability density function or discrete probability distribution function.

An information processing method according to this invention comprises a function generation step of generating concept notation function which is a function for representing matter that registered word which is word registered into dictionary indicates, and a correspondence providing step of allowing the registered word and the concept notation function with respect to that registered word to correspond to each other.

A recording medium according to this invention is adapted so that there is recorded program including a function generation step of generating concept notation function which is function for representing matter that registered word which is word registered into dictionary indicates, and a correspondence providing step of allowing the registered word and the concept notation function with respect to that registered word to correspond to each other.

In the information processing apparatus, the information processing method and the recording medium according to this invention, a concept notation function which is a function for representing matter that a registered word which is a word registered into dictionary indicates is generated. Thus, correspondence between the registered word and the concept notation function with respect to that registered word is provided.

BRIEF DESCRIPTION OF THE DRAWINGS

FIGS. 3A and 3B illustrate a word dictionary and a word train dictionary stored in a registered word train data base 23 of FIG. 2.

BEST MODE FOR CARRYING OUT THE INVENTION

Figure 1:
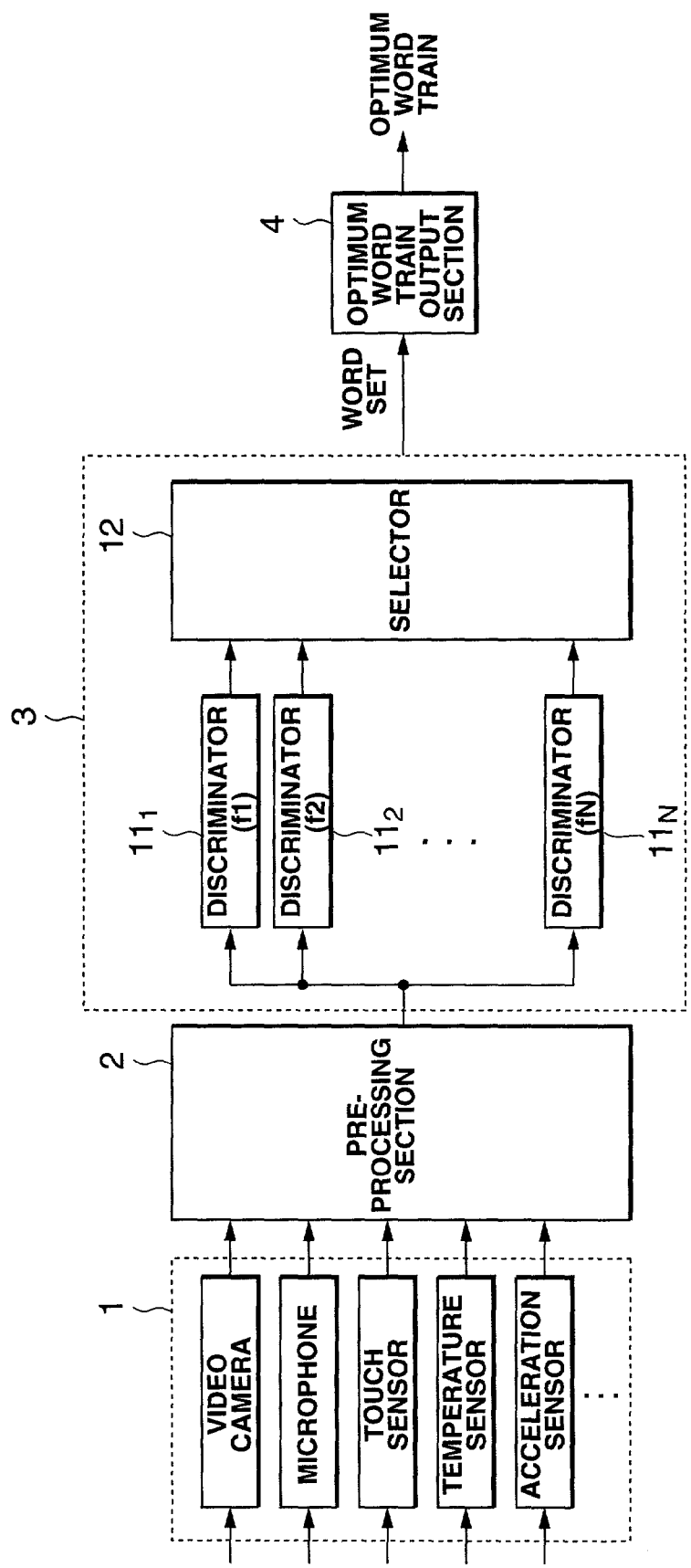
FIG. 1 is a block diagram showing an example of configuration of an embodiment of an optimum word train output apparatus according to the present invention.

FIG. 1 shows an example of the configuration of an embodiment of an optimum word train output apparatus according to the present invention.

In this optimum word train output apparatus, a word train suitably representing a matter is outputted from set of words (word set) constituting the word train indicating the matter.

Namely, a sensor section 1 is adapted to sense stimulus given, with a more practical matter being as object, from that matter (hereinafter referred to as remarked matter as occasion may demand) to output the sensed result to a pre-processing section 2. In the embodiment of FIG. 1, the sensor section 1 is composed of video camera as device for converting light into an electric signal, microphone as a device for converting sound into an electric signal, touch sensor, temperature sensor and acceleration sensor, etc. Accordingly, in the sensor section 1, the color, shape, size, position, direction and speed (velocity), etc. of the remarked matter are sensed.

In the pre-processing section 2, the output from the sensor section 1 is processed and feature parameter (feature vector) is extracted from that output. Namely, in the pre-processing section 2, by the sensor section 1, feature parameters for the information obtained by observing the remarked matter are determined (Accordingly, parameters indicating features of remarked matter such as color, shape, size, position direction and speed (velocity), etc. of the remarked matter). Such feature parameters are delivered to a word set output section 3.

The word set output section 3 is composed of N number of discriminators $11_1$ to $11_N$ and a selector 12, and serves to output set of words constituting the word train which represents the remarked matter observed by the sensor section 1.

Namely, the discriminator $11_N$ discriminates its remarked matter, on the basis of the feature parameter obtained from the remarked matter, by pattern recognition, etc. to output its discrimination result. Specifically, the discriminator $11_N$ stores discrimination function $f_N$ (model) for discriminating matter that a certain word #N represents to calculate its discrimination function $f_N$ by using the feature parameter from the pre-processing section 2. Further, the discriminator $11_N$ outputs, to the selector 12, calculation result of discrimination function $f_N$ (hereinafter referred to as function value as occasion may demand), text notation and sound notation of word #N indicating matter discriminated by the discrimination function $f_N$, and the discrimination function $f_N$ as the discrimination result of a matter that the word #N represents.

When the selector 12 receives the discrimination results from the respective discriminators $11_1$ to $11_N$, it selects, e.g., discrimination result in which function values of the discrimination functions $f_1$ to $f_N$ are a predetermined value from those discrimination results. Namely, here, the larger the function value of the discrimination function $f_N$ becomes, the higher the certainty that remarked matter is represented by word #N becomes. Thus, the selector 12 selects the discrimination result or results in which function value is a predetermined value or more as the discrimination result suitable for representing the remarked matter.

Here, it is considered that in the case where remarked matter is, e.g., a large red sphere, the function values of discrimination functions for discriminating words which respectively represent three matters "large", "red" and "sphere" among the discrimination functions $f_1$ to $f_N$ are all predetermined values or more Accordingly, in this case, at the selector 12, such three discrimination results are selected. In this embodiment, it is assumed that plural discrimination results are essentially selected at the selector 12 in this way.

When the selector 12 selects plural discrimination results corresponding to respective words which represent the remarked matter as described above, it inputs the selected plural discrimination results to an optimum word train output section 4.

Here, at the discriminator $11_N$, discrimination function $f_N$ used for discriminating the matter that word #N represents is obtained by carrying out learning by using the feature parameters obtained by observing an individual practical matter that word #N represents. Accordingly, feature parameters consisting of the individual practical matters that the word #N represents are expressed representatively.

On the other hand, when the function which represents a matter is assumed to be a concept notation function, the discrimination function $f_N$ representatively expresses the feature parameters obtained from practical respective matters that the word #N represents as described above. Accordingly, the discrimination function $f_N$ can be grasped as a sort of the concept notation function. It is to be noted that the discrimination function $f_N$ can be only grasped also as concept notation function. Accordingly, functions except for discrimination function $f_N$ may be used as the concept notation function.

Moreover, in the following description, a word w is assumed to be used by definition as described below as occasion demands.

$$w = (L, P, C) \qquad (1)$$

In the above formula, L indicates a character string representing word (text notation), P indicates a notation for representing word by sound (sound notation), and C indicates a notation for representing matter that word indicates (concept notation).

As the sound notation P, there can be used a probability model such as HMM (Hidden Markov Model), etc. obtained by carrying out learning by using the sound pattern which features sound voice when a word is pronounced, for example. In addition, as the concept notation C, there may be used the discrimination function $f_N$ which is the concept notation function.

It is to be noted that, with respect to learning method for generating the probability model using as the sound notation P, the detail thereof is described in, e.g., Keinosuke Fukunaga, "Statistical Pattern Recognition", Academic Press, 1990; Lawence Rabiner, Biing-Hwang Juang (translated by Ken Furui); and "Foundation of Sound Recognition (1st and 2nd volumes)", NTT Advance Technology Kabushiki Kaisha, 1995, etc.

The selector 12 supplies each of the plural discrimination results with respect to the remarked matter to the optimum word train output section 4 as set in the form of word defined by the formula (1).

Namely, when it is now assumed that plural words which suitably represent the remarked matter are expressed as $w_1$, $w_2$, ..., the selector 12 supplies the set of these plural words $w_1$, $w_2$, ... to the optimum word train output section 4.

Here, set of plural words $w_1$, $w_2$, ... (word set) W is defined as indicated by the following formula (2).

$$W = \{w_1, w_2, \ldots\} \quad (2)$$

Moreover, an arrangement of plural words $w_1$, $w_2$, ... (word train) s is defined as indicated by the following formula (3).

$$S = [w_1, w_2, \ldots] \quad (3)$$

Further, the set of plural word trains $s_1$, $s_2$, ... (word train set) S is defined as indicated by the following formula (4).

$$S = \{s_1, s_2, \ldots\} \quad (4)$$

It is to be noted that the word set W is set of plural words $w_1$, $w_2$, ... and the arrangement of these plural words $w_1$, $w_2$, ... is not meaningful (word set consisting of the same words is considered to be the same set even if the arrangement of those words is different). On the other hand, the word train is an arrangement of plural words $w_1$, $W_2$, ..., and an arrangement of those words $w_1$, $W_2$, ... is meaningful (even the word train consisting of the same words is considered to be different word train if the arrangement of those words is different).

When the optimum word train output section 4 receives set the word W of plural words $w_1$, $w_2$, ... which suitably represent the remarked matter from the word set output section 3 (selector 12), it constitutes the word train (or sentence) as an arrangement of words which suitably represent the remarked matter (hereinafter referred to as an optimum word train as occasion demands) from words constituting its word set, and outputs it.

Figure 2:
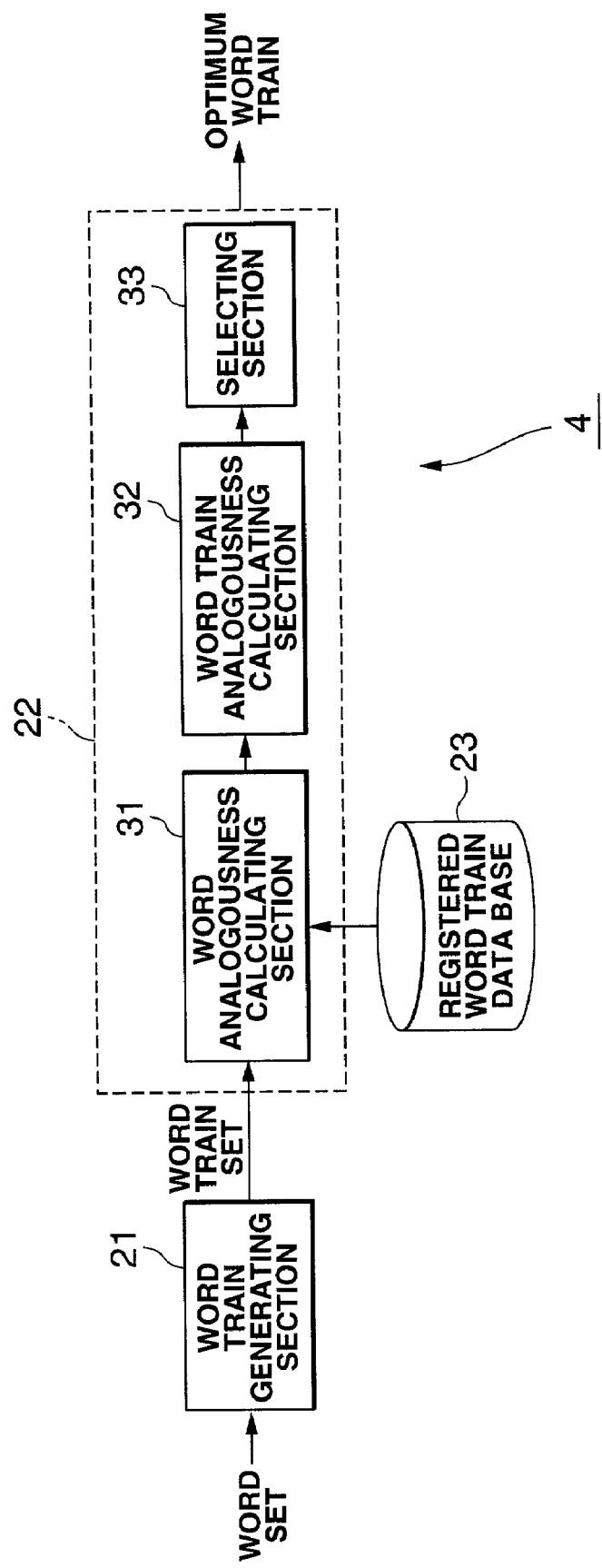
FIG. 2 is a block diagram showing an example of configuration of optimum word train output section 4 of FIG. 1.

FIG. 2 shows an example of the configuration of the optimum word train output section 4 of FIG. 1.

The word set W from the word set output section 3 (FIG. 1) (hereinafter referred to as an input word set as occasion demands) is inputted to a word train generating section 21. The word train generating section 21 generates all of permutation of words (hereinafter referred to as input word train as occasion demands) $s_1$, $s_2$ ... constituted by using all of plural words $w_1$, $w_2$, .... (hereinafter referred to as an input word as occasion demands) constituting an input word set W to output sets of all word trains S (hereinafter referred to as an input word train set as occasion demands) to an optimum word train search section 22. Here, in the case where word set that the word set output section 3 outputs consists of M number of words, M! kinds of word trains are generated at the word train generating section 21 (! indicates a factorial).

The optimum word train search section 22 searches, by making reference to a registered word train data base 23, the optimum word train from input word trains $s_1$, $s_2$, ... constituting the input word train set S from the word train generating section 21, and output the searched optimum word train.

Namely, the optimum word train search section 22 is composed of a word analogousness calculating section 31, a word train analogousness calculating section 32 and a selecting section 33, and serves to calculate, with respect to respective the input word trains $s_1$, $s_2$, ... constituting the input word train set S, the word analogousness for respective word trains registered in the registered word train data base 23 (registered word train) to select, from the input word trains $s_1$, $s_2$, ... the input word train in which maximum word train analogousness (the greater its value is, the higher the analogousness between word trains is) is obtained, and outputs the selected input word train as the optimum word train.

Specifically, the word analogousness calculating section 31 calculates, on the basis of concept notation function, the word analogousness between each input word $w_{ij}$ constituting the input word train $s_i$ and a word corresponding to the input word $w_{ij}$ (a word positioned in the same order as the input word $w_{ij}$) constituting the registered word train, and outputs the calculated word analogousness to the word train analogousness calculating section 32.

In this case, word $w_{ij}$ means word located at the j-th position from the leading portion of the word train $s_i$.

The word train analogousness calculating section 32 calculates, on the basis of the word analogousness between each word constituting the input word train $s_i$ and words constituting the registered word train corresponding to that word, the word train analogousness between the input word train $s_i$ and the registered word train, and outputs the calculated word train analogousness to the selecting section 33.

The selecting section 33 selects the input word train in which the word train analogousness with respect to registered word train is caused to be maximum of the input word trains $s_1$, $s_2$, ... constituting input word train set S, and outputs the selected input word train.

The registered word train data base 23 stores a word dictionary and a word train dictionary as shown in FIG. 3, for example. Namely, in the word dictionary, as shown in FIG. 3A, registered words are registered in such a form text notation, sound notation and concept notation are caused to correspond thereto as defined in the formula (1). In the word train dictionary, there are the registered word trains in which plural registered words are caused to be arranged in a form of arrangements to give a certain meaning (registered word train).

It is to be noted that it is not necessarily required to store word train dictionary in which the registered word trains are registered in the registered word train data base 23. Namely, if rules of grammar, etc. are registered in the registered word train data base 23, it is possible to prepare registered word train by arranging the registered words registered in the word dictionary on the basis of corresponding rule.

The processing of the optimum word train output section 4 of FIG. 2 will now be described.

When the word train generating section 21 receives the input word set W from the word set output section 3 (FIG. 1), it generates input word trains $s_1$, $s_2$, ... constituted of plural input words $w_1$, $w_2$, ... constituting the input word set W, and outputs the set of the selected word train (input word train set) S to the optimum word train search section 22.

When the optimum word train search section 22 receives the input word train set S from the word train generating section 21, it carries out optimum word train search processing to search optimum word train from input word trains $s_1$, $s_2$ ... constituting input word train set S while making reference to the registered word train data base 23 to output the searched optimum word train.

Figure 4:
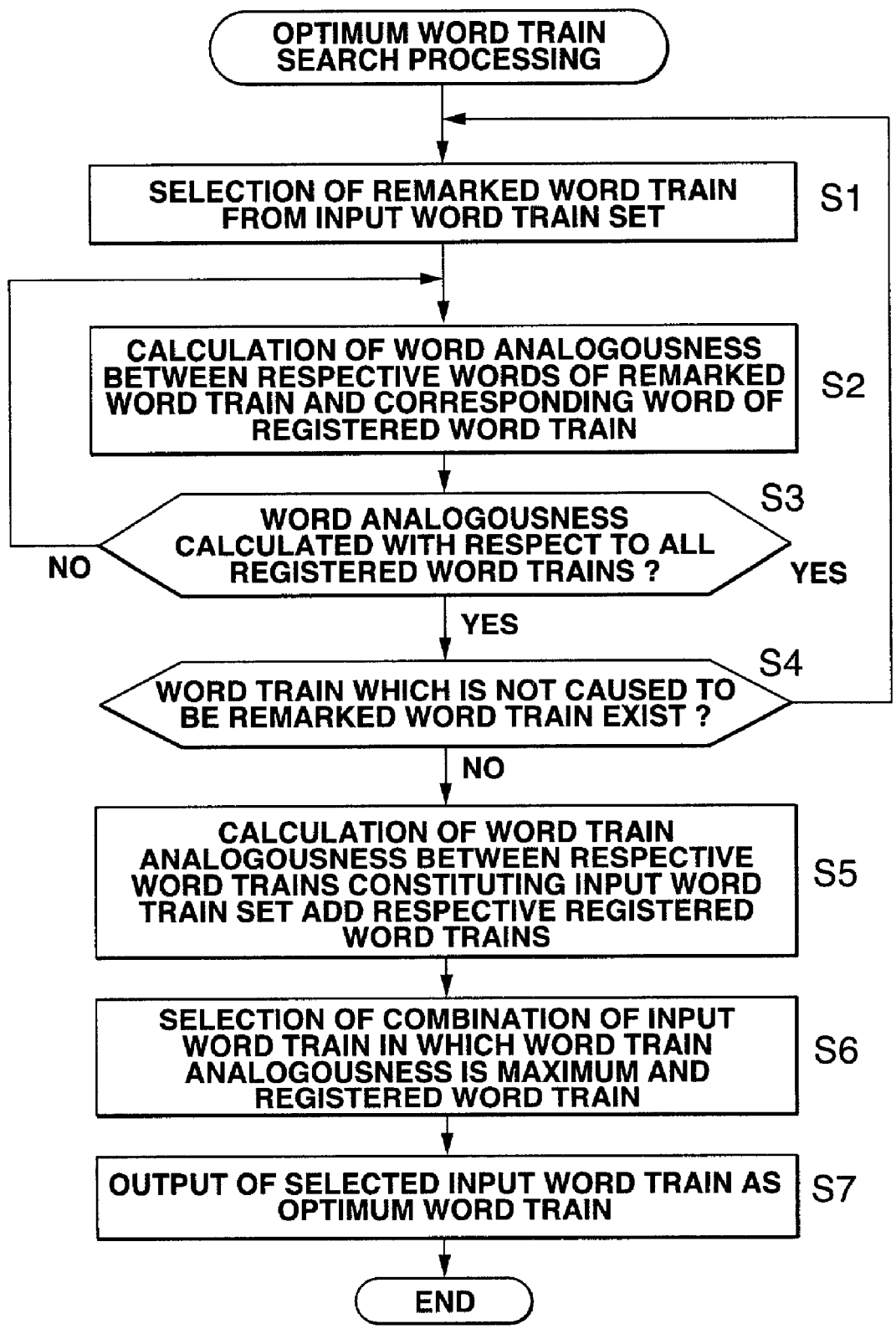
FIG. 4 is a flowchart for explaining an optimum word train search processing that a optimum word train search section 22 of FIG. 2 carries out.

Namely, as indicated by the flowchart of FIG. 4, in the optimum word train search processing, first of all, at step S1, the word analogousness calculating section 31 selects a certain word train $s_i$ as the remarked word train from the input word train set S. The processing procedure proceeds to step S2. At the step S2, the word analogousness calculating section 31 selects a certain registered word train as the remarked registered word train from the dictionary of registered word train data base 23, and calculates, on the basis of concept notation function, the word analogousness between respective words constituting the remarked word train $s_i$ and the word among the remarked registered word train corresponding to the respective words.

Namely, when words of remarked word train and registered word train caused to undergo calculation of word analogousness are respectively expressed as w_1 and w_2, these words w_1 and w_2 can be expressed by the following formulas from the formula (1).

$$w\_1 = (L\_1, P\_1, C\_1)$$

$$w\_2 = (L\_2, P\_2, C\_2) \quad (5)$$

In the above formula, L_1, P_1, C_1 respectively indicate the text notation, sound notation and concept notion of the word w_1. Similarly, L_2, P_2, C_2 respectively indicate text notation, sound notation and concept notation of the word w_2.

As the concept notation function used as the concept notation, e.g., Gaussian probability distribution function can be used. Now, when Gaussian probability distribution function in which mean vector is x and a covariance matrix is $\Sigma$ is expressed as N (x, $\Sigma$), the concept notations C_1 and C_2 of the formula (5) can be expressed by the following formula.

$$C\_1 = N(x_1, \Sigma_1)$$

$$C\_2 = N(x_2, \Sigma_2) \quad (6)$$

In the above formula, $x_i$ and $\Sigma_1$ respectively indicates a mean value and a covariance matrix of feature parameters obtained from the individual practical matters that word w_1 represents. Similarly, $x_2$ and $\Sigma_2$ respectively indicates a mean value and a covariance matrix of feature parameters obtained from the individual practical matters that the word w_2 represents.

It is to be noted that, in this embodiment, as described above, the concept notation function of input word is equal to the discrimination function for discriminating that the input word, and the discrimination function $f_N$ that discriminator $11_N$ of FIG. 1 has is thus represented by a Gaussian probability distribution function.

Here, the mean value $x_1$ and the covariance matrix $\Sigma_1$ which prescribe Gaussian probability distribution function N ($x_1$, $\Sigma_1$) as the discrimination function for discriminating matter that the word w_1 of remarked word train represents are determined by carrying out learning by using feature parameters obtained from the individual practical matters that the word w_1 represents. In addition, the mean value $x_2$ and the covariance matrix $\Sigma_2$, which prescribe the Gaussian probability distribution function N ($x_2$, $\Sigma_2$) as concept notation function with respect to the matter that the word w_2 of registered word train represents are also determined by carrying out learning by using feature parameters obtained from the individual practical matters that the word w_2 represents.

In the case where Gaussian probability distribution function is used as the concept notation function, word analogousness $R_w$ (w_1, w_2) between two words w_1 and w_2 can be calculated by, e.g., the following formula (7) by using Bhattacharyya distance of the Gaussian distributions as respective concept notation functions.

$$R_w(w\_1, w\_2) = \frac{1}{2}\ln\frac{\left|\frac{\sum 1 + \sum 2}{2}\right|}{\sqrt{|\Sigma 1||\Sigma 2|}} \quad (7)$$

In the above formula, ln(x) represents natural logarithm of x.

Here, in a calculation of the Bhattacharyya distance of Gaussian distribution, the mean vector is also taken into consideration in general. In this example, since attention is paid to difference between relative shapes of Gaussian distributions with respect to two words (in the case where the comparison is carried out in the state where relative positions of two Gaussian distributions are disregarded, i.e., in the case where comparison is made in the state where only parallel displacement of two Gaussian distributions is permitted (Accordingly, rotation, contraction and expansion are excluded), whether or not shapes of the two Gaussian distributions resemble), the formula (7) is formula using only the covariance matrix.

Namely, in accordance with the formula (7), the word analogousness $R_w$ (w_1, w_2) between two words w_1 and w_2 is determined in dependency upon whether or not the relative shapes of the Gaussian distributions of feature parameters obtained from matters that each of words w 1 and w 2 respectively represent resemble each other or not.

It is to be noted that the value of the word analogousness $R_w$ (w_1, w_2) determined by the formula (7) becomes larger according as the relative shapes of Gaussian distributions with respect to the respective words w_1 and w_2 resemble, i.e., the analogousness in point of meaning of words w_1 and w_2 becomes higher.

At step S2, word analogousness between respective words constituting the remarked word train and a word of the remarked registered word train corresponding to that word is calculated. Then, the processing procedure proceeds to step S3. The word analogousness calculating section 31 judges whether or not calculation of word analogousness at the step S2 is carried out while all registered word trains being as remarked registered word train. In the case where it is judged at the step S3 that the calculation of word analogousness at the step S2 is not carried out with all registered word trains being as the remarked registered word train, the processing procedure returns to the step S2. Then, a similar processing is repeated with registered word train which is not yet caused to be remarked registered word train being as new remarked registered word train.

Moreover, in the case where it is judged at the step S3 that the calculation of word analogousness at the step S2 is carried out with all registered word trains being as the remarked registered word train, the processing procedure proceeds to step S4, at which it is judged whether or not there is the input word train which is not yet caused to be remarked word train of input word train set. In the case where it is judged at the step S4 that there is input word train which is not yet caused to be the remarked word train of the input word train set, the processing procedure returns to the step S1 to repeat the processing at the step S2 and steps subsequent thereto with the input word train which is not yet caused to be the remarked word train being as a new remarked word train.

On the other hand, in the case where it is judged at the step S4 that there is no input word train which is not yet caused to be the remarked word train of the input word train set, i.e., in the case where there is carried out the calculation of word analogousness between all input word trains constituting input word train set and words constituting respective registered word trains registered in the registered word train data base 23, the processing procedure proceeds to step S5. In the word train analogousness calculating section 32, there is the calculated word train analogousness between respective word trains constituting the input word train set and the respective registered word trains.

Namely, the word analogousness determined in the analogousness calculating section 31 is delivered to the word train analogousness calculating section 32. In the word train analogousness calculating section 32, at the step S5, there are the calculated word train analogousness between respective word trains constituting the input word train set and respective registered word train by using word analogousness from the word analogousness calculating section 31.

Namely, a certain input word train constituting the input word train set is assumed to be $s_1$ and a certain registered word train is assumed to be $s_2$. Further, when the numbers of words constituting word trains $s_1$ and $s_2$ are respectively expressed as $L(s_1)$ and $L(s_2)$, the word train analogousness $R_s(s_1, s_2)$ between two word trains s, and $s_2$ is calculated, at the word train analogousness calculating section 32, in accordance with, e.g., the following formula (8).

In the case of $L(s_1)=L(s_2)$, $$R_s(s_1, s_2) \sum_{j=1}^{L(s_1)} R_w(W_{1i}, W_{2i})$$

In the case of $L(s_1) \neq L(s_2)$, $$R_s(s_1, s_2) = 0 \tag{8}$$

In the above formula, a word $w_{ij}$ means the j-th word from the leading portion of the word train s, as described above.

Accordingly, in the case where the input word train $s_1$ and the registered word train $s_2$ are constituted by the same number of words, the word train analogousness $R_s(s_1, s_2)$ between the two is determined as the sum total of the word analogousness between respective words constituting input word train $s_1$ and words constituting the registered word train $s_2$ corresponding to such words. In addition, in the case where the input word train $s_1$ and the registered word train $s_2$ are constituted by different number of words, such word analogousness $R_s(s_1, s_2)$ is caused to be zero.

It is to be noted that the value of the word train analogousness $R_s(s_1, s_2)$ between the word trains $s_1$ and $s_2$ determined by the formula (8) becomes larger according as the analogousness in point of meaning between the word trains s, and $s_2$ is higher similarly to the word analogousness $R_w$ (w_1, w_2) determined by the formula (7).

When the word train analogousness calculating section 32 calculates the word train analogousness between respective word trains constituting the input word train set and the respective registered word trains at step S5, it delivers its word train analogousness to the selecting section 33.

In the selecting section 33, at step S6, the maximum value of word train analogousness from the word train analogousness calculating section 32 is determined. Thus, the combination of the input word train in which the maximum word train analogousness is obtained and the registered word train is selected. Further, the processing procedure proceeds to step S7 and the selecting section 33 outputs, as the optimum word train, input word train selected at the step S6. Thus, the optimum word train search processing is completed.

Namely, the input word train set and the set of registered word trains registered in the input word train set and the registered word train data base 23 are assumed to be respectively S and S', and respective sets are assumed to be expressed as follows.

$$S=\{s_1, s_2, \ldots\}$$

$$S'=\{s_1', s_2' \ldots\} \tag{9}$$

In the above formula, $s_1$, $s_2$, respectively indicate input word trains, and $s_1'$, $S_2'$ ... respectively indicate registered word trains.

In this case, at the selecting section 33, optimum word train $s_{suitable}$ is determined from input word train set S in accordance with the following formula (10).

$$S_{suitable} = \underset{s_j \in S}{\mathrm{argmax}} \{\underset{s_j' \in S'}{\max} \{R_s(s_i, s_j')\}\} \tag{10}$$

In the above formula, max {x} indicates maximum value of x, and argmax {x} indicates an argument which provides the maximum value of X.

As described above, a word is inputted to the optimum word train output section 4 along with the concept notation function which represents a matter that the word indicates, and the word analogousness between its input word and the registered word registered in the registered word train data base 23 is calculated on the basis of the concept notation function at the optimum word train output section 4. Accordingly, even if the same registered word as input word is not registered in the registered word train data base 23, word analogousness between input word and registered word can be calculated, and word train analogousness between input word train and registered word train can be also calculated. As a result, even if large scale dictionary is not provided, calculation of analogousness between words can be made with respect to many words. Further, even if complicated grammatical rule, etc. is not provided, it is possible to convert set of words into word train which provides suitable meaning.

Figure 5:
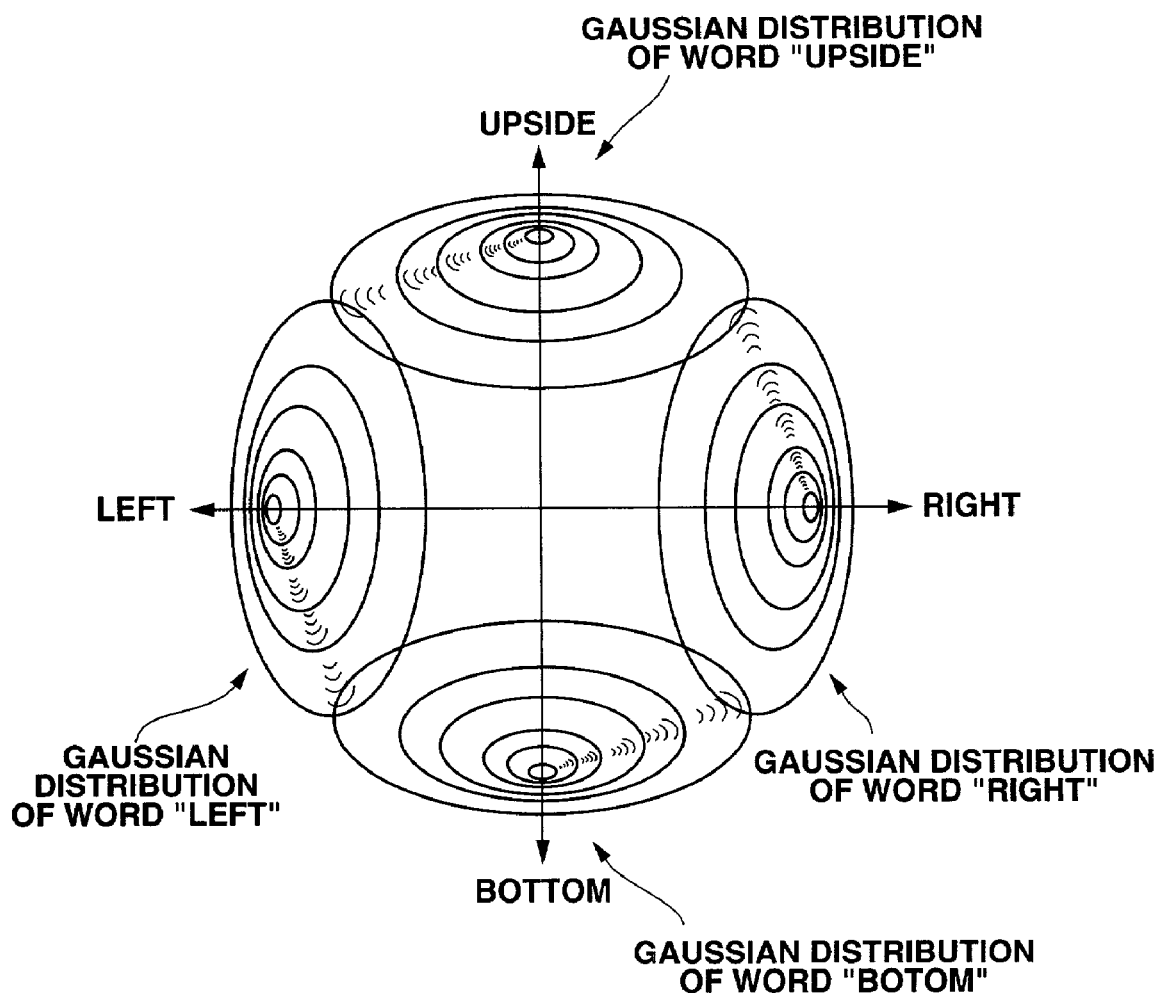
FIG. 5 illustrates a Gaussian distribution in feature parameter space indicating two-dimensional direction.

Namely, it is considered that Gaussian distributions as concept notation functions of words "upside", "bottom", "left" and "right", e.g., in the feature parameter space indicating two-dimensional directions are such that according as positions are shifted in the directions of upside, bottom, left and right, occurrence probabilities respectively become high as shown in FIG. 5. In this example, in FIG. 5, direction perpendicular to the drawing indicates height of probability, and notation is employed such that portions where probabilities are the same are connected by lines.

It is now assumed that, in the registered word train data base 23, "left" and "upside" are registered as registered word and "left and upside" is registered as registered word train, and it is further assumed that sets of words "bottom" and "right" which are not registered in the registered word train data base 23 are inputted to word train generating section 21 (FIG. 2) as word set.

In this case, at the word train generating section 21, "bottom and right" and "right and bottom" are generated as input word train. Such word trains are delivered to the optimum word train search section 22.

In the optimum word train search section 22, at the word analogousness calculating section 31, there is calculated the word analogousness between respective words constituting input word train "bottom and right" and words constituting registered word train "left and upside" corresponding to those words, and there is calculated word analogousness between respective words constituting input word train "right and bottom" and words constituting registered word train "left and upside" corresponding to those words.

Namely, with respect to input word train "bottom and right", there are calculated word analogousness between word "bottom" and word "left" and word analogousness between word "right" and word "upside". Moreover, with respect to input word "right and bottom", there are calculated word analogousness between word "right" and word "left" and word analogousness between word "bottom" and word "upside".

Further, at the word train analogousness calculating section 32, sum of word analogousness between word "bottom" and word "left" and word analogousness of word "right" and word "upside" is calculated as word train analogousness between input word train "bottom and right" and registered word train "left and upside", and sum of word analogousness between word "right" and word "left" and word analogousness between word "bottom" and word "upside" is calculated as word train analogousness between input word train "right and bottom" and registered word train "left and upside".

Figure 6:
FIG. 6 illustrates the outline of Gaussian distribution represented by concept notation function.
Figure 6:
Figure 6:
Figure 6:

Now, from Gaussian distributions as concept notation functions of words "upside", "bottom", "left" and "right" shown in FIG. 5, schematic respective shapes are as shown in FIG. 6. As apparent from FIG. 6, shapes of Gaussian distributions of words "upside" and "bottom" resemble each other, and shapes of Gaussian distributions of words "left" and "right" resemble each other. However, shapes of Gaussian distributions of words "upside" and "right" or "left" do not resemble each other, and shapes of Gaussian distributions of words "bottom" and "right" or "left" do not resemble each other.

Accordingly, the word analogousness between word "right" and word "left" and the word analogousness between word "bottom" and word "upside" are both large values, but the word analogousness between word "bottom" and word "left" and the word analogousness between word "right" and word "upside" are both small values.

As a result, the word train analogousness between the input word train "right and bottom" and the registered word train "left and upside" which is a sum of the word analogousness between the word "right" and the word "left" and the word analogousness between word "bottom" and word "upside" becomes large value, and word train analogousness between the input word train "bottom and right" and the registered word train "left and upside" which is a sum of the word analogousness between the word "bottom" and the word "left" and the word analogousness between the word "right" and the word "upside" becomes small value.

Accordingly, at the selecting section 33, the combination of the input word train "right and bottom" and the registered word train "left and upside" which has a large word analogousness is selected. Thus, the input word train "right and bottom" is outputted as an optimum word train. Namely, as the input word train, "bottom and right" and "right and bottom" are obtained. In this case, more suitable "right and bottom" thereof as an arrangement of words is outputted as the optimum word train.

Moreover, it is now assumed that, e.g., in the registered word train data base 23, "red" and "shoes" are registered as the registered word, and "red shoes" is registered as a registered word train. Even in the case where set of the word "white" which is not registered in the registered word train data base 23 and the word "shoes" registered in the registered word train data base 23 is inputted to the word train generating section 21 as a word set, the word train "white shoes" is outputted as the optimum word train in a manner similar to the above-described case.

As described above, with respect to input words which are not registered in the registered word train data base 23, the word analogousness can be calculated. Further, with respect to the input word train including such input words, the word train analogousness can be also calculated. Accordingly, even if large scale dictionary is not provided, the calculation of analogousness between words can be made with respect to many words. Further, even if a complicated grammatical rule and/or a word train consisting of the same word as the input word train are not registered as the registered word train, it is possible to convert the set of words into the word train which provides suitable meaning (optimum word train).

Figure 7:
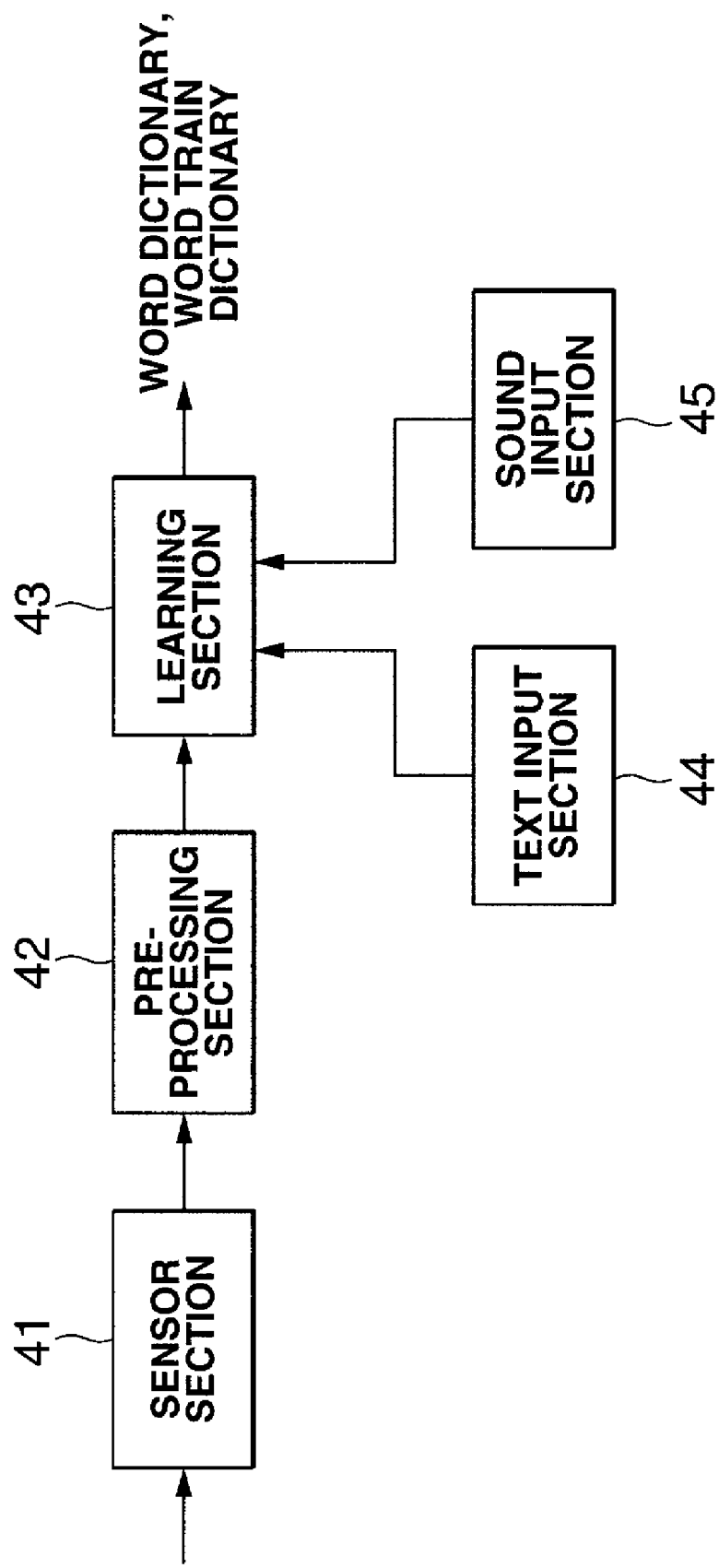
FIG. 7 is a block diagram showing an example of configuration of an embodiment of a learning apparatus according to the present invention.

FIG. 7 shows an example of the configuration of an embodiment of a learning apparatus which carries out learning processing for preparing a word dictionary and a word train dictionary caused to be stored into the registered word train data base 23 of FIG. 2.

A sensor section 41 is constituted similarly to the sensor section 1 of FIG. 2, and is adapted to sense stimulus given from practical matter to be learned (hereinafter referred to as a matter to be learned as occasion demands) to output the sensed result to a pre-processing section 42.

The pre-processing section 42 is constituted similarly to the pre-processing section 2 of FIG. 2, and serves to process the output from the sensor section 41 to extract feature parameters from that output. Namely, the pre-processing section 42 determines feature parameters with respect to information obtained as the result of the fact that matter to be learned is observed by the sensor section 41 to output them to a learning section 43.

The learning section 43 is supplied with feature parameters with respect to the matter to be learned from the pre-processing section 42, and is supplied with character strings and sounds representing respective words constituting the word train representing the matter to be learned from a text input section 44 and a sound input section 45. Further, the learning section 43 carries out learning by using feature parameters with respect to respective words constituting the word trains which represent the matter to be learned to thereby generate the concept notation function which represents matter indicated by respective words and to respectively generate the text notation and the sound notation on the basis of the character string and the sound delivered from the text input section 44 and the sound input section 45 to prepare the word dictionary as shown in FIG. 3A in such a manner that the text notation, the sound notation and the concept notation function with respect to respective words are caused to correspond thereto. Further, the learning section 43 is also adapted to prepare the word train dictionary as shown in FIG. 3B in which word trains which represent the matter to be learned are registered.

The text input section 44 is constituted by, e.g., a keyboard, etc. and is operated when character strings which represent respective words constituting the word train which represents matter to be learned are inputted. The sound input section 45 is constituted by, e.g., a microphone, etc. To the sound input section 45, a sound in which respective words constituting the word train which represents the matter to be learned are pronounced is inputted.

Figure 8:
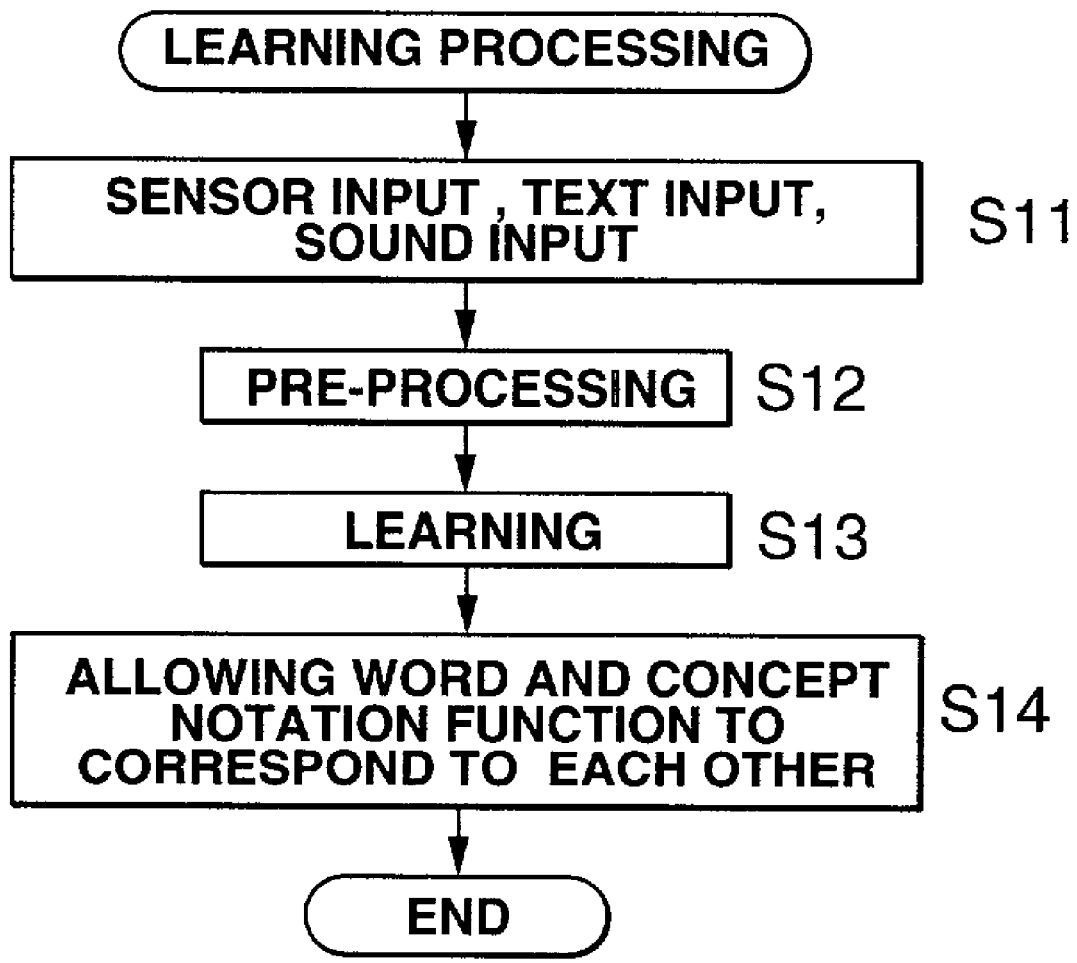
FIG. 8 is a flowchart for explaining learning processing by the learning apparatus of FIG. 7.

The learning processing by the learning apparatus of FIG. 7 will now be described with reference to the flowchart of FIG. 8.

Initially, at step S11, in the sensor section 41, stimulus given from the matter to be learned is sensed. From the text input section 44 and the sound input section 45, the character string and sound representing respective words constituting the word train which represents matter to be learned are respectively inputted. Further, a result of sensing by the sensor section 41 is delivered to the pre-processing section 42, and character strings and sounds from respective text input section 44 and sound input section 45 are both delivered to the learning section 43.

When the pre-processing section 42 receives the result of sensing by the sensor section 41, it extracts, at step S12, the feature parameter from the result of that sensing to deliver it to the learning section 43.

In this example, in the sensor section 41, stimulus given from different matters to be learned represented by the word train caused to undergo learning (e.g., if word train to be learned is blue ball, various blue balls (e.g., blue base ball, blue soccer ball, etc.) as the practical individual matters correspond to different matters to be learned mentioned here) is sensed, and is delivered to the pre-processing section 42. Accordingly, at the pre-processing section 42, the feature parameters are extracted with respect to respective stimuli given from such different matters to be learned, and are delivered to the learning section 43. Accordingly, when attention is paid to one word constituting word train caused to undergo learning, plural feature parameters obtained from stimuli given from different matters which is represented by that word are extracted at the pre-processing section 42. The feature parameters thus obtained are delivered to the learning section 43.

When the learning section 43 receives the feature parameters with respect to the different matters which are represented by words with respect to respective words constituting the word train caused to undergo learning, it carries out learning by using plural feature parameters obtained with respect to respective words constituting the word train caused to undergo learning at step S13 to determine the function representing its distribution, e.g., its Gaussian probability distribution function, etc. as the concept notation function with respect to respective words. Further, the learning section 43 generates the text notation and the sound notation with respect to respective words constituting word train caused to undergo learning from character string from the text input section 44 and the sound input section 45 to allow concept notation functions of respective words to correspond thereto at step S14 to thereby generate the word dictionary, and to prepare word train dictionary in which word trains which represent matter to be learned are registered to complete learning processing for to the word train which is subjected of a current learning.

It is to be noted that as a method of carrying out a learning by using feature parameters with respect to the respective different matters which are represented by certain words, i.e., plural feature parameters, there may be used methods described in, e.g., the above-described article "Statistical Pattern Recognition" and "Foundation of Sound Recognition (first and second volumes)", etc.

The above-described series of processing may be carried out by a hardware, and may be carried out by software. In the case where a series of processing are carried out by software, a program constituting that the software is installed into a computer assembled in the optimum word train output apparatus or the learning apparatus as a dedicated hardware or a general-purpose computer, etc.

Explanation will now be given with reference to FIG. 9 in connection with a recording medium adapted so that corresponding program is recorded, which is used for installing the program which executes the above-described series of processing into the computer so that such program can be executed by the computer.

Figure 9A:
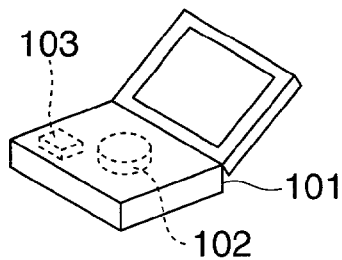
FIGS. 9A to 9C are figures for explaining recording media according to the present invention.

The program can be recorded in advance into a hard disc 102 or a semiconductor memory 103 as which serves as a recording medium included within a computer 101 as shown in FIG. 9A.

Alternatively, such program can be temporarily or permanently stored (recorded) onto a recording medium such as a floppy disc 111, a CD-ROM (Compact Disc Read Only Memory) 112, a MO (Magneto Optical) disc 113, a DVD (Digital Versatile Disc) 114, a magnetic disc 115, or a semiconductor memory 116, etc. Such recording medium can be provided as a so-called package software.

It is to be noted that, in addition to the fact that program is installed into computer from the recording media as described above, there may be employed, as shown in FIG. 9C, an approach to transfer program by radio to computer 101 through an artificial satellite 122 for a digital satellite broadcast from down-load site 121, or to transfer it by wire to computer 123 through a network 131 such as LAN (Local Area Network) or Internet, thus to install it onto the hard disc 102, etc. included therein.

In addition, in this specification, it is not necessarily required to process the steps which describe the program for allowing the computer to carry out the processing in a time series manner along the order described as the flowchart, but the processing executed in parallel or individually (e.g., a parallel processing or a processing by object) is also included.

Figure 9B:
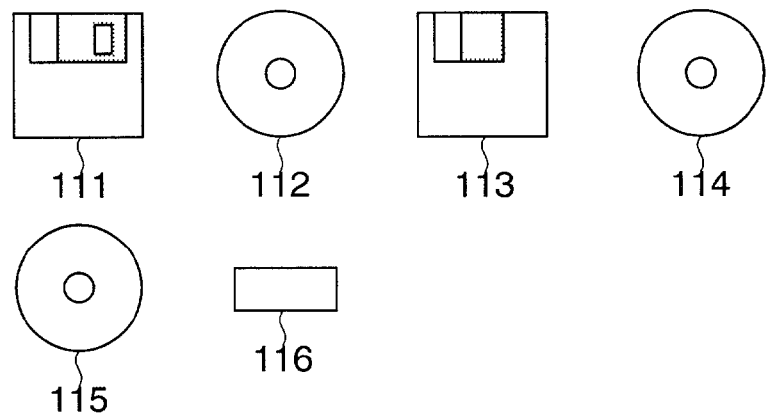
Figure 9C:
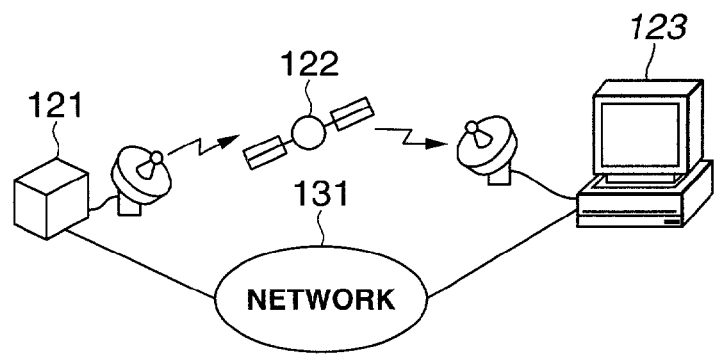
Figure 10:
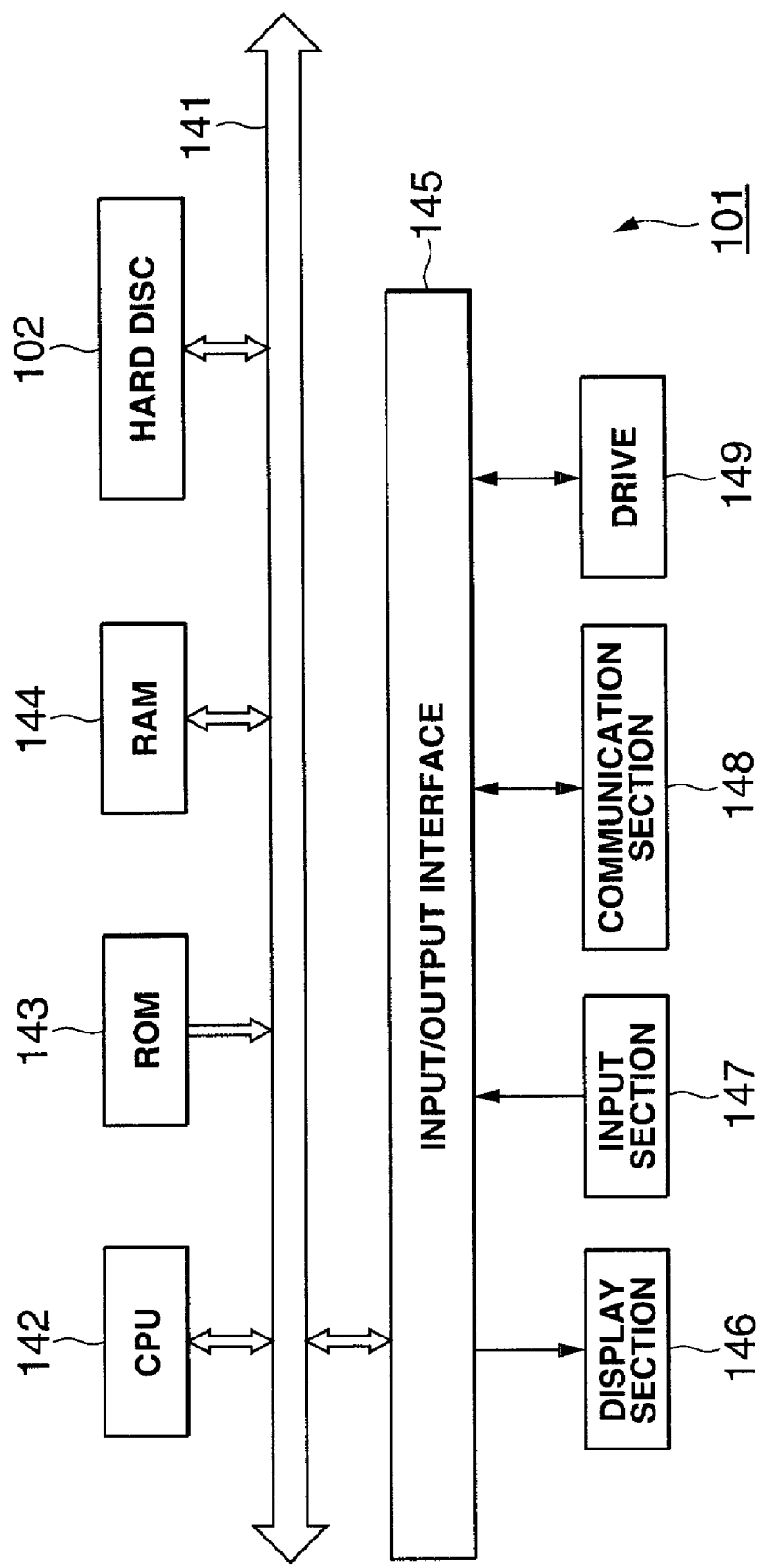
FIG. 10 is a block diagram showing an example of configuration of a computer 101 of FIG. 9.

FIG. 10 shows an example of the configuration of the computer 101 of FIG. 9.

The computer 101 includes a CPU (Central Processing Unit) 142 as shown in FIG. 10. An input/output interface 145 is connected to the CPU 142 through a bus 141. When command is inputted in to the CPU 142 by users' operation of an input section 147 constituted by keyboard or mouse, etc. through the input/output interface 145, the CPU 142 executes program stored in a ROM (Read Only Memory) 143 corresponding to the semiconductor memory 103 of FIG. 9A in accordance with that command. Also, the CPU 142 loads, into a RAM (Random Access Memory) 144, a program stored on the hard disc 102, a program transferred from the artificial satellite 122 or the network 131, received at a communication section 148 and installed on the hard disc 102, or a program which is read out from the floppy disc 111, the CD-ROM 112, the MO disc 113, the DVD 114 or the magnetic disc 115, each of which is equipped with respect to a drive 149 and is installed onto hard disc 102 to execute such program. Further, the CPU 142 outputs, as occasion demands, its processed result to a display section 146 constituted by a LCD (Liquid Crystal Display), etc. through the input/output interface 145, for example.

It is to be noted that while, in this embodiment, stimulus from the matter sensed by the sensor section 1 or 41 is used to determine the concept notation function which represents that matter, the concept notation function may be determined, e.g., by using sound, etc. in which words which represent matter are pronounced in place of stimulus from matter. In the case where stimulus from the matter is used to determine the concept notation function which represents that matter, practical matters existing in realistic world and words which represent that the matter are permitted to correspond to each other. As a result, it is possible to realize, e.g., such a robot which can sense stimulus given from a certain matter by various sensors to output, from the sensed results, word trains which suitably represents that matter, or other system for carrying out language processing while having relevancy to user or surrounding of real world.

Moreover, while Gaussian probability distribution function is used as the concept notation function in this embodiment, there may be used, as the concept notation function, the probability density function except for the Gaussian probability distribution function and the discrete probability distribution function represented by HMM, etc.

Further, while the word analogousness between two words is determined by using Bhattacharyya distance of the concept notation function in this embodiment, the word analogousness may be determined on the basis of Kullback divergence of the concept notation function, etc. Namely, the word analogousness can be determined on the basis of physical quantity in which analogousness of shapes of distributions, etc. represented by the concept notation functions of respective two words is reflected.

Further, while a method of outputting the optimum word train by the optimum word train output section 4 is not particularly referred to in this embodiment, e.g., the optimum word train may be such that respective words can be indicated in order of arrangement of words constituting its optimum word train, or may be outputted by speech sound (synthetic sound). The indication of the optimum word train may be carried out by using text notation of respective words. In addition, the output by the speech sound of the optimum word train may be carried out by generating synthetic sounds by using sound notation of respective words.

INDUSTRIAL APPLICABILITY

In accordance with the first information processing apparatus, the first information processing method and the first recording medium of this invention, words are inputted along with a concept notation function which is a function representing a matter which those words indicate, and word analogousness which is analogousness between a word and a registered word is calculated on the basis of that concept notation function. Accordingly, even when the same word as an inputted sound is not registered as the registered word, it is possible to calculate the word analogousness between that inputted word and the registered word.

In accordance with the second information apparatus, the second information processing method and the second recording medium of this invention, a concept notation function which is a function representing a matter that a registered word which is a word registered into the dictionary indicates is generated, and the registered word and the concept notation function with respect to that registered word are caused to correspond to each other. Accordingly, by using the concept notation function, it becomes possible to calculate analogousness between words.

What is claimed is:

1. An information processing apparatus for determining analogousness between input words and registered words registered in a dictionary, the information processing apparatus comprising:
 a sensor section configured to sense an object related to said input words, and generating a sensed output;
 a pre-processing section configured to receive said sensed output, and extract feature parameters of said object related to said input words from said sensed output;
 a plurality of discriminators configured to receive said feature parameters of said object, and process said feature parameters to generate notation functions using a plurality of discrimination functions;
 a selector configured to select a plurality of discriminated words representing said object;
 a word train generating section configured to receive said plurality of discriminated words along with said notation functions, said word train generating section operating to generate a set of word trains by using all permutations of said plurality of discriminated words; and
 word analogousness calculating means configured to calculate word analogousness between each word train of said set of word trains and a registered word train using said notation functions,
 wherein said feature parameters include parameters indicating color, shape, size, position, direction, and/or velocity of said object.

2. The information processing apparatus as set forth in claim 1, wherein said notation functions include
 a concept notation function.

3. The information processing apparatus as set forth in claim 1, wherein said plurality of discrimination functions is generated in a learning process.

4. The information processing apparatus as set forth in claim 3, wherein said learning process uses said feature parameters obtained by observing said object.

5. The information processing apparatus as set forth in claim 1, wherein said word analogousness calculating means also calculates word analogousness between a word in said each word train and a word in said registered word train using a concept notation function.

6. The information processing apparatus as set forth in claim 5, wherein the concept notation function includes a probability density function.

7. The information processing apparatus as set forth in claim 5, wherein the word analogousness calculating means calculates the word analogousness between the word in said each word train and the word in said registered word train on the basis of Bhattacharyya distance or Kullback divergence between the concept notation functions of the word in said word train and the word in said registered word train.

8. An information processing method for determining analogousness between input words and registered words registered in a dictionary, the information processing method comprising:
 sensing an object related to said input words, and generating a sensed output;
 receiving said sensed output and extracting feature parameters of said object related to said input words from said sensed output;
 processing said feature parameters to generate notation functions using a plurality of discrimination functions;
 selecting a plurality of discriminated words representing said object;
 generating a set of word trains by using all permutations of said plurality of discriminated words; and
 calculating word analogousness between each word train of said set of word trains and a registered word train using said notation functions.

9. A recording medium on which a program for determining analogousness between input words and registered words registered in a dictionary is recorded, the program comprising the executable instructions to:
 sense an object related to said input words, and generating a sensed output;

receive said sensed output and extract feature parameters of said object related to said input words from said sensed output;

process said feature parameters to generate notation functions using a plurality of discrimination functions;

select a plurality of discriminated words representing said object;

generate a set of word trains by using all permutations of said plurality of discriminated words; and calculate word analogousness between each word train of said set of word trains and a registered word train using said notation functions.

* * * * *